United States Patent [19]

Brunsch et al.

[11] 4,426,265
[45] Jan. 17, 1984

[54] METHOD OF PRODUCING A METALLIC THIN FILM MAGNETIC DISK

[75] Inventors: Arwed Brunsch, Stuttgart; Wolf-Dieter Ruh; Gerhard Trippel, both of Sindelfingen, all of Fed. Rep. of Germany

[73] Assignee: International Business Machines Corporation, Armonk, N.Y.

[21] Appl. No.: 352,736

[22] Filed: Feb. 26, 1982

[30] Foreign Application Priority Data

Apr. 11, 1981 [DE] Fed. Rep. of Germany ....... 3114740

[51] Int. Cl.³ .............................................. C23C 15/00
[52] U.S. Cl. ................... 204/192 M; 428/900
[58] Field of Search ................... 204/192 M; 428/900

[56] References Cited

U.S. PATENT DOCUMENTS

| | | | |
|---|---|---|---|
| 3,850,690 | 11/1974 | Lee et al. | 117/240 |
| 3,996,095 | 12/1976 | Ahu | 204/192 M X |
| 4,245,008 | 1/1981 | Michaelsen et al. | 428/611 |
| 4,260,466 | 4/1981 | Shirahata et al. | 204/192 M |

FOREIGN PATENT DOCUMENTS

| | | | |
|---|---|---|---|
| 47907 | 7/1979 | European Pat. Off. | 204/192 M |
| 1408753 | 10/1975 | United Kingdom. | |
| 1439869 | 6/1976 | United Kingdom. | |

*Primary Examiner*—Bernard D. Pianalto
*Attorney, Agent, or Firm*—Walter J. Madden, Jr.

[57] ABSTRACT

For a metallic thin film magnetic disk, a chromium undercoat and a magnetic layer, in particular of an FeCoCr alloy, are obliquely sputtered by means of a sputtering system onto a substrate at an angle of incidence of about 60°. The operating pressure of the argon gas atmosphere is between 5 and 15 μbar and the thickness ($t_{Cr}$) of the undercoat, which also influences the coercive field strength, is between about 50 and 180 nm. By means of a sector shutter of suitable shape, the thickness distribution between the inner diameter ID and the outer diameter OD of the storage area of the magnetic disk can be influenced in the desired manner.

4 Claims, 5 Drawing Figures

METHOD OF PRODUCING A METALLIC THIN FILM MAGNETIC DISK

BACKGROUND OF THE INVENTION

1. Field of the Invention

The invention concerns a method of producing a metallic thin film magnetic disk in which a metal undercoat, in particular of chromium, is initially applied to a substrate and a metallic magnetic layer is subsequently vacuum-applied at an angle of between about 50° and 75° obliquely to the substrate normal.

2. Description of the Prior Art

U.K. Pat. No. 1,439,869 shows a magnetic record carrier having a metallic intermediate layer or an undercoat of chromium, titanium, manganese or vanadium applied to a substrate consisting, for example, of an aluminum alloy. Subsequently, a very thin metallic magnetic recording layer of an iron-cobalt alloy is applied to this undercoat. Both the undercoat and the magnetic thin film are applied in a vacuum which must be higher than 0.01 $\mu$bar. The magnetic layer consisting of iron-cobalt alloy is vapor deposited at an angle of incidence of about 60° to the substrate normal.

The oblique vapor deposition leads to a directional anisotropy of the magnetic film and thus to an increase in the coercive field strength. To ensure that the individual particles of the magnetic material are obliquely arranged on the record carrier, the vapor pressure must be such that the mean free path length corresponds at least to the spacing between the vapor deposition source and the substrate, i.e., on its way to the record carrier, the particle exiting from the source must not collide with a gas particle. This requirement is met by the minimum vacuum value of 0.01 $\mu$bar mentioned in the U.K. patent mentioned above.

When a multi-component alloy is vapor deposited, difficulties and instabilities occur because the vapor pressures of the materials, and thus the vapor deposition rates, are non-uniform. The composition of the vapor deposited magnetic material, for example, fluctuates irrespective of whether vapor deposition is effected from several sources, each with one material component, or from one source with a composite alloy material. The latter type of alloy is among those to which the rod feed technique is applied, for which purpose the alloy to be vapor deposited exists in rod form. With this technique, the rod is heated at its end, forming a melting pool, and advanced in accordance with the vapor deposition rate. During this, inhomogeneities in the material to be deposited and the formation of slag on the surface of the melting pool lead to fluctuations in the rates and concentration of the finished magnetic film.

A magnetic thin-film record carrier with a magnetic metal layer and a metallic undercoat is also shown in U.K. Pat. No. 1,408,753. The magnetic layer consists of iron-cobalt and is vapor deposited obliquely to the substrate normal at an angle of between 50° and 75°, preferably of about 60°, at a vacuum higher than about 0.1 $\mu$bar. The metallic undercoat containing, for example chromium, is not obliquely vapor deposited. With regard to the undercoat containing, for example, pure chromium and essentially chromium oxide, this patent states that the undercoat, because of its hardness as an oxide or nitride layer, leads to an increase in the coercive field strength, and that the pure chromium contained in it does not adversely affect the magnetic properties of the iron-cobalt layer which is subsequently obliquely vapor deposited.

In U.S. Pat. No. 3,850,690 a method is described for producing a metallic thin-film magnetic disk with different coercive field strengths at the inner and outer diameter, respectively. On both sides of a vertically arranged disk substrate, one vapor deposition source each for an iron-cobalt alloy is so arranged outside the cylinder described by the substrate during its rotation that the angle of incidence between the vapor beam and the vertical of the substrate is smaller at the outer diameter than at the inner diameter. The disk substrate is rotated and the thickness of the vapor deposited film is controlled by shields arranged on both sides. With this method, too, the magnetic film is obliquely vapor deposited at a vacuum higher than 0.01 $\mu$bar.

U.S. Pat. No. 4,245,008 shows the fabrication of a thin film disk by first sputtering an underlayer on a substrate and then sputtering a magnetic layer of CoCrFe on the underlayer.

The prior art shows quite clearly that the minimum vacuum pressure range for oblique deposition should be about 0.1 $\mu$bar, because of the mean free path length necessary for the vapor particles. For this reason, magnetic materials were previously applied exclusively by the vapor deposition method. This method is however elaborate and often unstable, thus not yielding optimum results.

SUMMARY OF THE INVENTION

The present invention provides a method for producing a metallic thin film magnetic disk which is simpler than previous methods, and which yields magnetic results which are similar or superior to those obtained with magnetic disks produced by prior art methods.

The advantages obtained by means of the invention are essentially that, compared to the vapor deposition method, the much simpler cathode sputtering method is used which produces magnetic disks whose magnetic characteristics are similar or superior to those of vapor deposited materials of the same kind. In addition, as the undercoat and the magnetic storage layer are sputtered at the same pressure, the present method can be developed in such a manner as to permit simple line production.

DESCRIPTION OF THE PREFERRED EMBODIMENT

Figure 1:
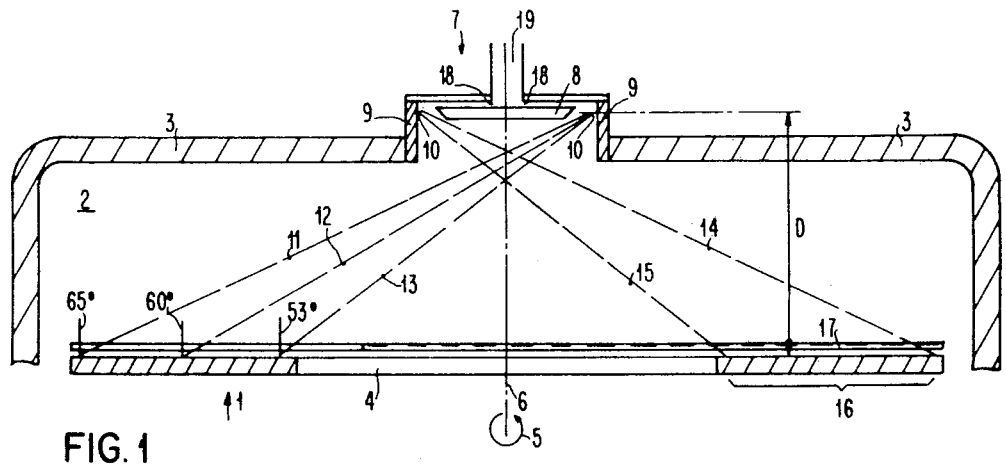
FIG. 1 is a schematic of the arrangement for implementing the method according to the invention.

Referring to FIG. 1, the magnetic disk 1 to be coated is located in a vacuum chamber 2 surrounded by a housing 3. The disk 1, provided with a center hole 4, is arranged to be rotatable about an axis 6, as marked by arrow 5. Centrosymmetrically thereto, a cathode sputtering system 7 with an anode 8 and a cathode 9 is provided. The cathode 9 is preferably arranged to annularly surround the anode. In the areas 10, the material is removed by the cathode and sputtered to be applied to the magnetic disk 1 in the direction of the beams 11 to 15. During this, area 16 for magnetic recording located between the outer diameter OD and the inner diameter ID is coated with magnetic particles at an angle of incidence to the substrate normal or the axis of rotation 6, which is about 53° at the inner diameter ID (beams 13, 15), about 65° at the outer diameter OD (beams 11, 14), and about 60° at the middle diameter MD, (beam 12).

Figure 2:
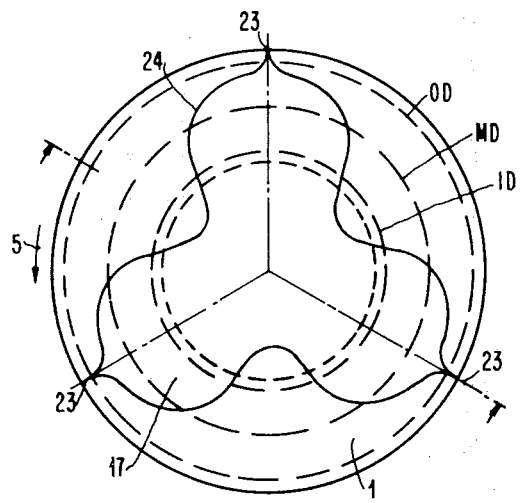
FIG. 2 is a plan view, at a scale different from that of FIG. 1, of the form and arrangement of the shutter on top of the disk.

Directly above or in front of the magnetic disk 1, a sector shutter 17 is arranged, a sectional view of which is marked by broken lines in FIG. 1, in order to show that it permits coating material to pass to the disk 1. A special form of the sector shutter 17 is shown in FIG. 2. The disk 1 is spaced from the cathode sputtering system 7 at a distance D which is such as to yield the specified and illustrated angle between the incident beams 11 to 15 of the material and the substrate normal 6. Above the anode 8, argon gas is introduced into the chamber 2 at points 18 via duct 19. The electrical contacts for the anode 8 and the cathode 9 are not shown.

Figure 3:
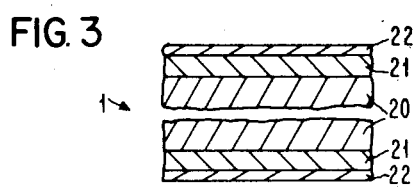
FIG. 3 shows the typical structure of the magnetic disk produced in accordance with the invention by way of a cut section.

FIG. 3 is a schematic of the typical structure of the magnetic disk 1 produced by means of the method of the invention. A core or substrate 20 is coated on both sides with an undercoat 21 to which a magnetic layer 22 is applied by means of the present method. The undercoat 21 consists of chromium which is applied at the specified oblique angle of incidence in an arrangement according to FIG. 1. After this chromium layer has been applied, the magnetic recording material, i.e., the iron-cobalt-chromium FeCoCr layer, is deposited. If desired, deposition can be simultaneously effected from both sides, for which purpose a second cathode sputtering system 7 with a second sector shutter is to be arranged below the magnetic disk 1 in FIG. 1.

The sector shutter 17 shown in FIG. 2 consists of three elements forming a three-leaf clover, and is fixed to retainers 23. The special curve shape 24 of this shutter ensures that during coating and rotation of the disk 1 in the direction of arrow 5, there is a uniform layer thickness at the inner diameter ID, the middle diameter MD and the outer diameter OD. A prerequisite for this is that a uniform thickness of the layer 21 or 22 is required between the inner diameter ID and the outer diameter OD. Alternatively, the shape of the sector shutter 17 can be chosen in such a manner that the layer thickness is non-uniform between the inner diameter ID and the outer diameter OD.

The operating pressure of the argon gas atmosphere existing in the vacuum chamber 2 during application of both the chromium undercoat 21 and the magnetic recording layer of the FeCoCr alloy has been chosen to range between 5 and 15 $\mu$bar in accordance with the invention, but should preferably be between 8 and 12 $\mu$bar.

Figure 4:
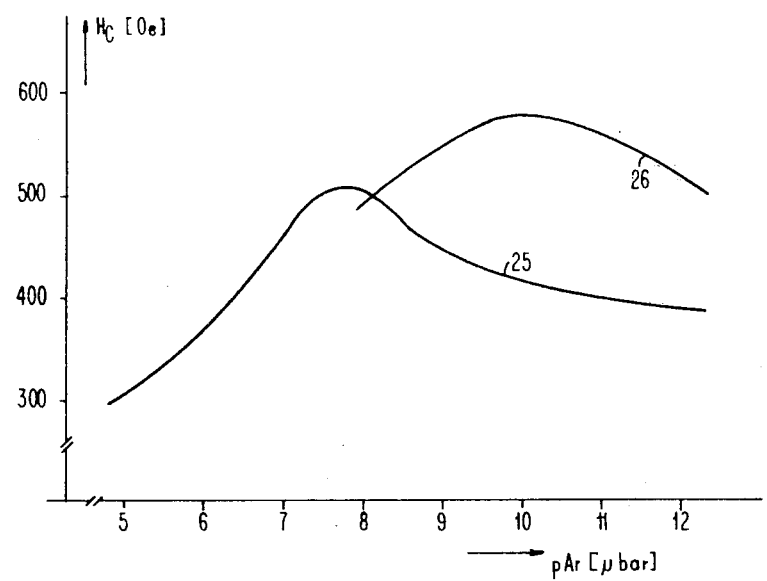
FIG. 4 is a diagram showing the magnetic field strength as a function of the pressure prevailing during cathode sputtering in a vacuum vessel for two different thicknesses of the magnetic layer.

In FIG. 4, the magnetic field strength $H_c$ for the two different magnetic layers is plotted as a function of the pressure of the argon atmosphere $p_{AR}$. The curve designated as 25 represents different disks which were coated at different pressures ranging from 5 to 12 $\mu$bar, and for which the thickness of the chromium undercoat $t_{Cr}$ was 90 nm, the spacing D between the cathode sputtering system 7 and the disk 1 was 12 cm, The sputtering rate was 3 nm/min, and the thickness of the magnetic FeCoCr layer was 48 nm. Curve 25 shows that at about 500 Oe, the highest magnetic field strength is obtained at a pressure of about 8 $\mu$bar if the deposition rate is 3 nm/min. It has been found that at a higher pressure of about 10 $\mu$bar and a higher deposition rate of 5 nm/min for the FeCoCr layer 22, a coercive field strength of almost 600 Oe is obtained. Curve 26 shows the different values of the coercive field strength for examples of the layer thickness of 30 nm and the deposition rate of 5 nm/min as a function of the different pressure values of the vacuum.

Figure 5:
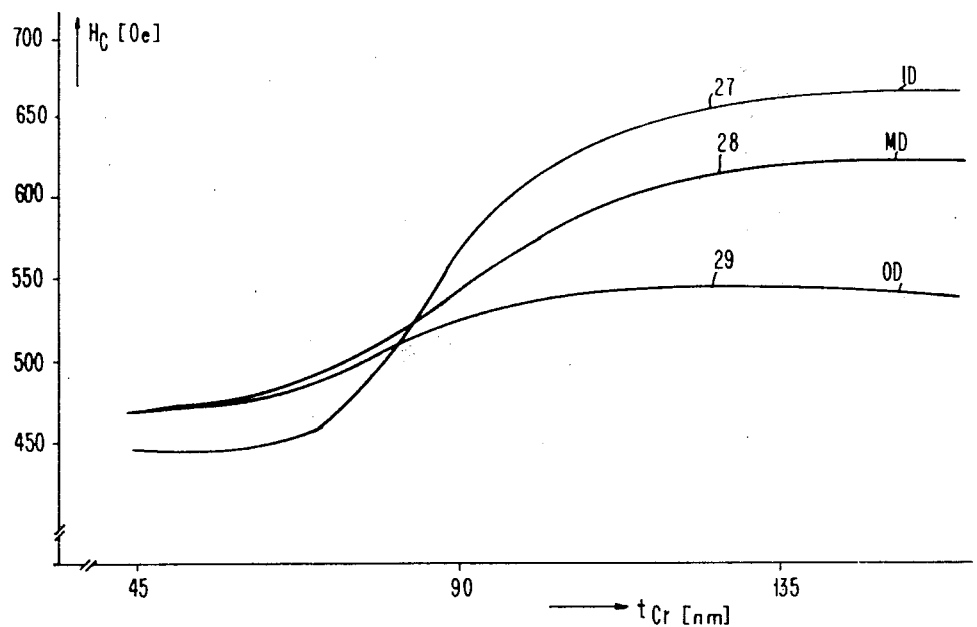
FIG. 5 is a graph showing magnetic field strength as a function of the thickness of the chromium undercoat at the inner, the middle, and the outer diameter of the recording area of a magnetic disk produced in accordance with the invention.

In FIG. 5 the coercive field strength $H_c$ of an FeCoCr magnetic film with a thickness of 30 nm is plotted as a function of the thickness $t_{Cr}$ of the chromium layer. The curves 27, 28 and 29 represent the coercivity at the inner diameter ID, the middle diameter MD and the outer diameter OD, respectively. The curves were obtained by producing samples of disks with different thicknesses $t_{Cr}$ of the chromium undercoat 21 and by applying to each disk an FeCoCr magnetic layer with a thickness of 30 nm. Subsequently, the coercive field strength was determined at the different diameters. It may be seen from the curves that at an undercoat thickness $t_{Cr}$ of 90 nm, quite favorable values, which do not differ from each other too much, are obtained at the inner diameter ID and the outer diameter OD. By varying the thickness $t_{Cr}$ of the chromium undercoat between inner diameter ID and outer diameter OD, it is possible to obtain a coercive field strength that is quite high.

We claim:

1. A method of producing a metallic magnetic thin film recording surface on a metallic substrate comprising the steps of
   sputtering an underlayer of Cr on said substrate as said substrate rotates,
   sputtering a metallic magnetic layer of Cr, Co and Fe on said Cr underlayer of said rotating substrate, said underlayer and said magnetic layer being sputter deposited at an angle between 50° and 75° obliquely to the substrate normal; and
   selectively shielding different portions of said rotating substrate from said sputtered material during sputtering of both said Cr underlayer and said Co Cr Fe magnetic layer to produce a magnetic recording surface of uniform thickness.

2. A method in accordance with claim 1, in which said Cr underlayer has a thickness of between 50 and 180 nm.

3. A method in accordance with claim 1, in which said Cr underlayer has a thickness of between 80 and 100 nm.

4. A method in accordance with claim 3, in which said magnetic layer is deposited to a thickness of 48 nm.

* * * * *